(12) United States Patent
Derraugh

(10) Patent No.: US 10,898,823 B2
(45) Date of Patent: Jan. 26, 2021

(54) BOARD FOR USE AS A BOOK PAGE OR PUZZLE WITH MOVING COMPONENT THAT ALTERS AN ILLUSTRATION AND EXPOSES A SENSOR TO ACTIVATE A CORRESPONDING SOUND

(71) Applicant: William Derraugh, Donaghadee (IE)

(72) Inventor: William Derraugh, Donaghadee (IE)

( * ) Notice: Subject to any disclaimer, the term of this patent is extended or adjusted under 35 U.S.C. 154(b) by 0 days.

(21) Appl. No.: 16/656,184

(22) Filed: Oct. 17, 2019

(65) Prior Publication Data

US 2020/0155959 A1 May 21, 2020

Related U.S. Application Data

(63) Continuation-in-part of application No. 16/213,848, filed on Dec. 7, 2018.

(60) Provisional application No. 62/595,864, filed on Dec. 7, 2017.

(51) Int. Cl.
| | |
|---|---|
| *G09B 5/06* | (2006.01) |
| *A63H 33/38* | (2006.01) |
| *A63F 9/06* | (2006.01) |
| *A63F 9/10* | (2006.01) |
| *A63F 9/24* | (2006.01) |

(52) U.S. Cl.
CPC ........... *A63H 33/38* (2013.01); *A63F 9/0613* (2013.01); *A63F 9/10* (2013.01); *G09B 5/062* (2013.01); *A63F 2009/064* (2013.01); *A63F 2009/1061* (2013.01); *A63F 2009/247* (2013.01)

(58) Field of Classification Search
CPC .... A63F 9/0613; A63F 9/10; A63F 2009/064; A63F 2009/2444; A63F 2009/1061; A63F 2009/247; G09B 5/062
USPC ................................ 446/147, 148, 149, 150
See application file for complete search history.

(56) References Cited

U.S. PATENT DOCUMENTS 6,525,706 B1 * 2/2003 Rehkemper .............. G09B 5/06
345/87

FOREIGN PATENT DOCUMENTS

EP         0609048 A1 *  8/1994  ............. G09B 5/062

* cited by examiner

*Primary Examiner* — Vishu K Mendiratta
(74) *Attorney, Agent, or Firm* — Tope-McKay & Associates

(57) ABSTRACT

Described is a board that is operable as a children's book or puzzle with parts that move, slide or turn on one lateral plane to physically change an illustration or part of the item and, as they slide or turn, activate a noise related to the illustration. The board includes a generally planar top illustrative layer. A bottom base layer is attached with the top illustrative layer. The bottom base layer includes a sensor (e.g., light or touch sensor) and sound generation components for generating a sound based upon actuation of the sensor. A moving component is movably connected with the bottom base layer. Finally, the sensor is connected with the bottom base layer and positioned such that moving the moving component from a first position to a second position exposes the sensor to cause the sound generation components to generate a sound.

1 Claim, 9 Drawing Sheets

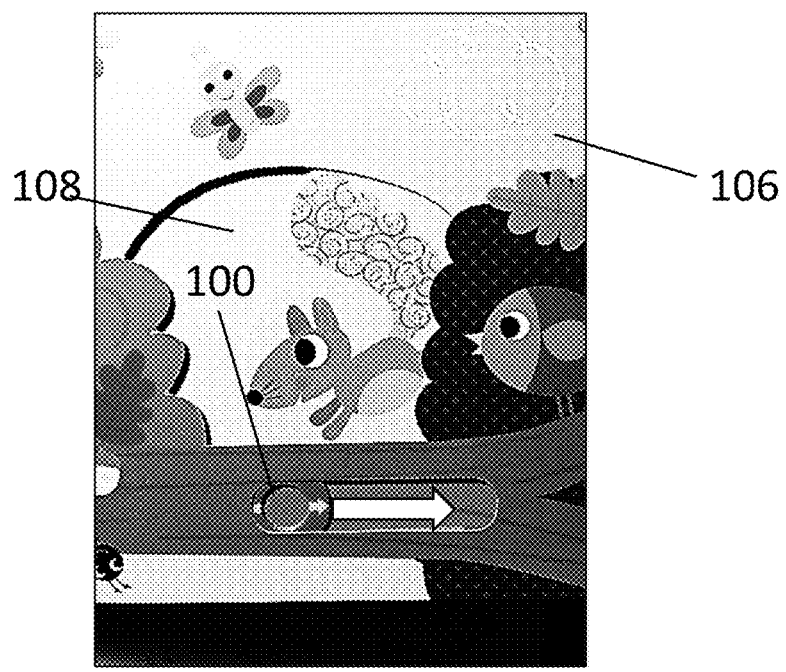
FIG. 1A
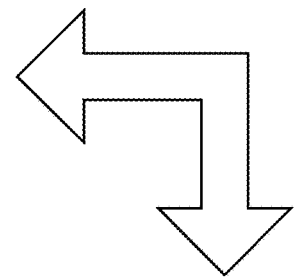
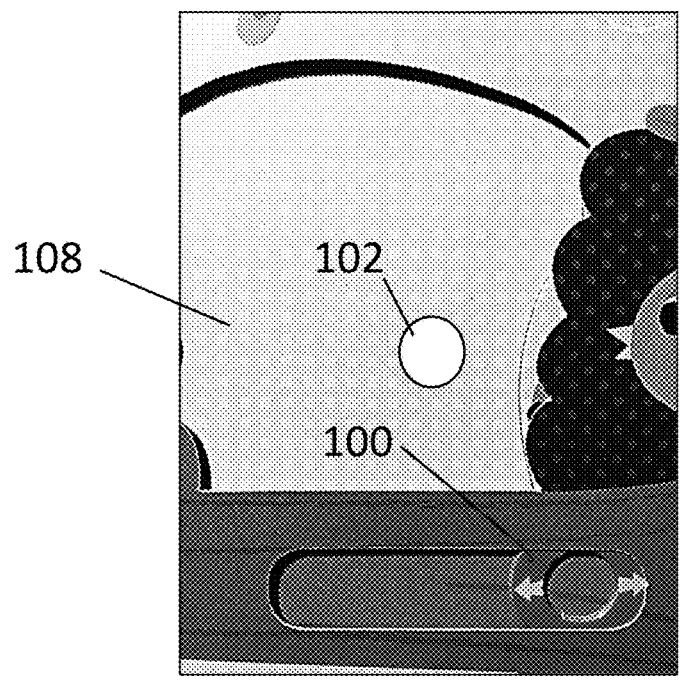
FIG. 1B

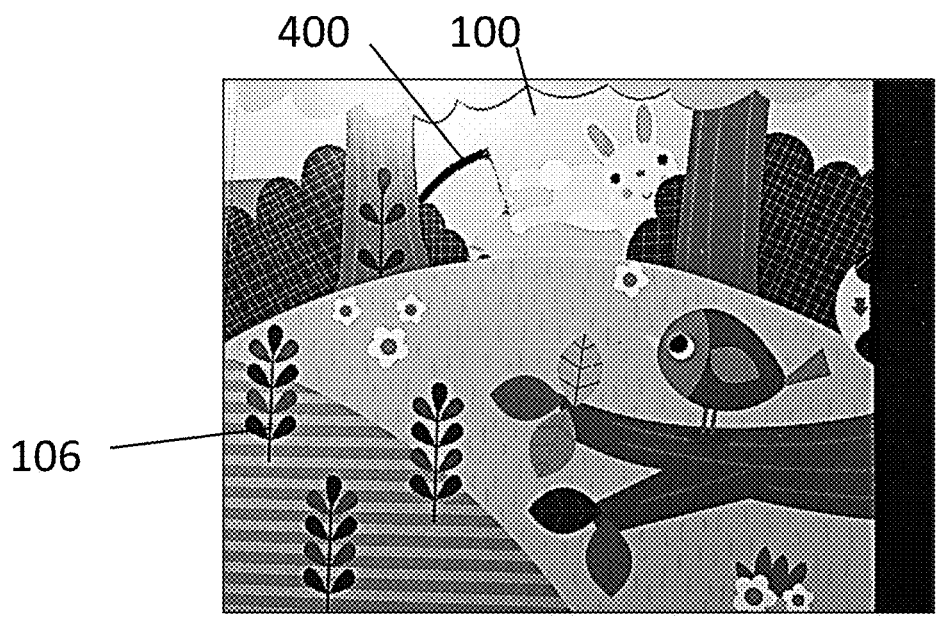
FIG. 4A
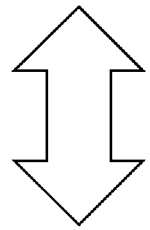
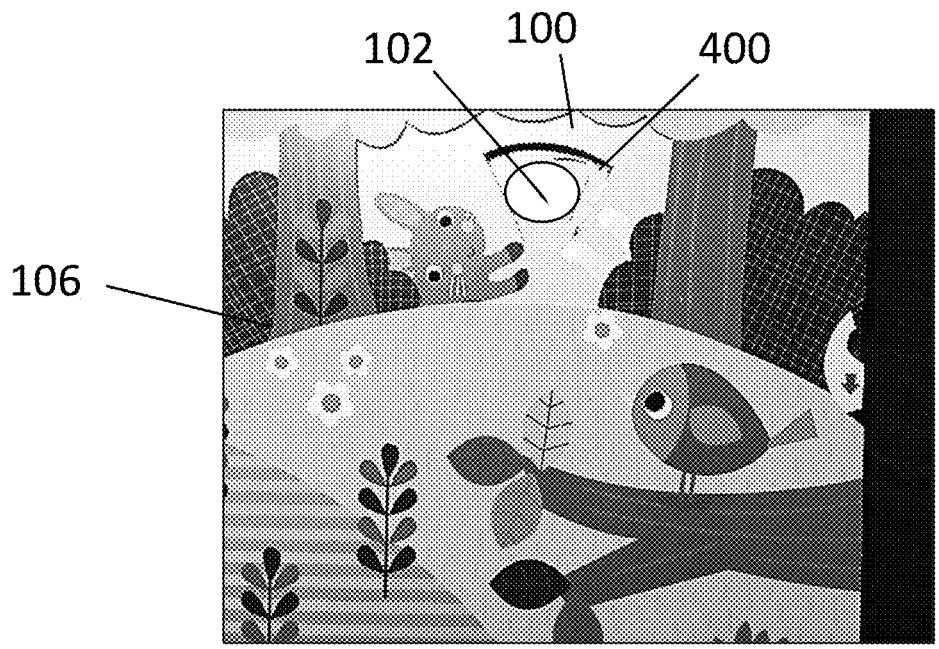
FIG. 4B

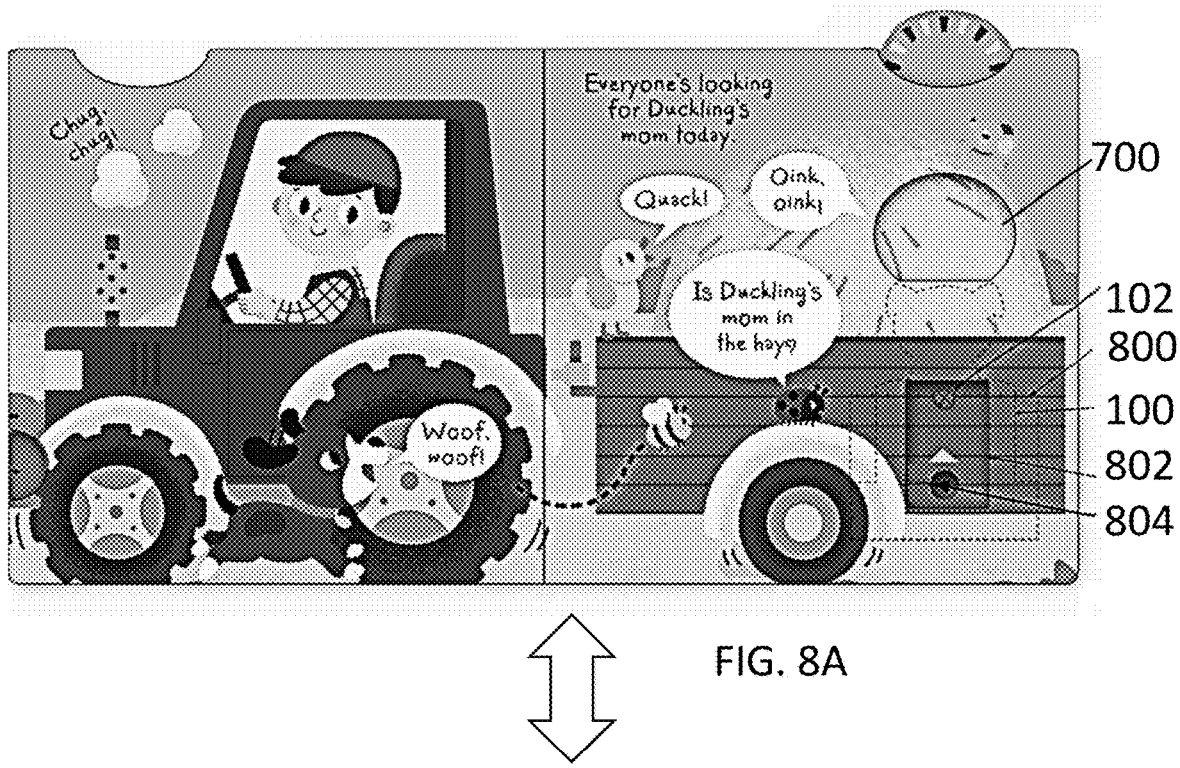

BOARD FOR USE AS A BOOK PAGE OR PUZZLE WITH MOVING COMPONENT THAT ALTERS AN ILLUSTRATION AND EXPOSES A SENSOR TO ACTIVATE A CORRESPONDING SOUND

CROSS-REFERENCE TO RELATED APPLICATIONS

The present application is a Continuation-in-Part application of Ser. No. 16/213,848, filed on Dec. 7, 2018, which is a non-provisional application of U.S. Provisional Application No. 62/595,864, filed on Dec. 7, 2017, the entirety of which are incorporated herein by reference.

BACKGROUND OF THE INVENTION

(1) Field of Invention

The present invention relates to children's books and puzzles and, more particularly, to a book or puzzle with parts that slide or turn on one lateral plane to physically change an illustration or part of the item and, as they slide or turn, activate a noise related to the illustration.

(2) Description of Related Art

This disclosure is directed to the field of sound generating books and puzzles. In the art there are books that have moving pieces that slide or turn on one lateral plane, changing an illustration as they do so. The moving action piece includes an illustration or part of an illustration that is visually and physically changed with the movement of the piece. However, such a movement does not cause any sound to be produced.

There are also books that make an electronic sound when a button is pressed. The button may be implanted in the pages or may be on an attached plastic unit. The button may have an image on it corresponding to the sound it will make. The button when pressed activates a switch which causes an electronic sound to be produced. However, the button in such a device only engages the auditory senses. Pressing the button does not result in any other movement or change an illustration.

Further, puzzles exist that make a noise when a piece is removed to expose a light sensor. These puzzles engage both auditory and visual senses, but they do not include a movement that physically changes an illustration. They also have a disadvantage in that the pieces can be separated from the puzzle board containing the sound unit, thus losing the interrelationship of picture and sound.

Thus, a continuing need exists for a book or puzzle with parts that slide or turn on one lateral plane to physically change an illustration or part of the item and, as they slide or turn, they activate a noise related to the illustration.

SUMMARY OF INVENTION

The present disclosure is directed to a board that is operable as a children's book or puzzle with parts that move, slide or turn to physically change an illustration or part of the item and, as they move, slide or turn, activate a noise related to the illustration. The board includes a generally planar top illustrative layer. A bottom base layer is attached with the top illustrative layer. The bottom base layer includes a sensor (e.g., light sensor or touch sensor) and sound generation components for generating a sound based upon actuation of the sensor. A moving component is movably connected with the bottom base layer. Finally, the sensor is connected with the bottom base layer and positioned such that moving the moving component from a first position to a second position exposes the sensor to cause the sound generation components to generate a sound.

In another aspect, moving the moving component form the first to second position alters an illustration as viewable by a user and, in doing so, exposes the sensor.

In yet another aspect, the moving component is movably connected in a lateral plane between the top illustrative layer and the bottom base layer such that at least a portion of the moving component is sandwiched between the top illustrative layer and the bottom base layer.

In yet another aspect, the moving component is slidably sandwiched between the top illustrative layer and bottom base layer.

Further, the moving component is pivotally sandwiched between the top illustrative layer and bottom base layer.

In another aspect, the top illustrative layer, moving component, and bottom base layer collectively form a page of a book.

In yet another aspect, the board is a puzzle board, such that the top illustrative layer includes a cut-out shape and the moving component is formed to match with and fit within the cut-out shape.

In another aspect, the moving component is slidably sandwiched between the top illustrative layer and bottom base layer and wherein a second moving component is pivotally sandwiched between a second top illustrative layer and a second bottom base layer, thereby forming a board or multiple pages in a book that have different forms of moving components.

In another aspect, the moving component includes a finger tab formed such that when the moving component moves from the first position to the second position, the finger tab is aligned with the sensor to expose the sensor to a user's touch to allow for activation of the sound generation components.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1A is an illustration of a page or puzzle piece with a moving component in a first position;

FIG. 1B is an illustration of the page or puzzle piece as shown in FIG. 1A, depicting the moving component in the second position to expose a sensor;

FIG. 4A is an illustration of a page or puzzle piece with a moving component in a first position;

FIG. 4B is an illustration of the page or puzzle piece as shown in FIG. 4A, depicting the moving component in the second position to expose a sensor;

FIG. 8A is an illustration depicting an aspect where the sensor is a touch sensor according to various embodiments of the present invention, depicting the moving component in a concealed position to conceal the touch sensor;

FIG. 8B is an illustration of the page or puzzle as shown in FIG. 8A, depicting the moving component as lifted up to an exposed position to expose the touch sensor;

DETAILED DESCRIPTION

Figure 2A:
FIG. 2A is an illustration of a page or puzzle piece with a moving component in a first position.

The present invention relates to children's books and puzzles and, more particularly, to a book or puzzle with parts that slide or turn on one lateral plane to physically change an illustration or part of the item and, as they slide or turn, activate a noise related to the illustration. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

This disclosure is directed to a board that operates as a page of a book or as a puzzle board with one or more action pieces (moving component) that slide or turn on a lateral plane to physically change an illustration or part of the item. Further and of particular importance, as the action piece slides or turns, a light sensor or other sensor or actuatable element is actuated to activate a noise related to the illustration. For example, the book or puzzle includes moving components that activate sound on the pages of a board book or a board/wood puzzle (or other suitable object).

In various aspects and as shown in FIGS. 1A through 7B, the moving component 100 mechanisms work by exposing a light sensor 102 (e.g., a light receptor positioned underneath the moving action piece) that are attached to wires or otherwise connected to sound generation components, such as a circuit board and/or speaker 104. The moving component 100 may be moved laterally (e.g., slid or rotated) to alter the illustration of the book or puzzle and, further, expose an implanted sensor 102 (e.g., light sensor) fastened to the surface underneath the action piece 100. In another example, the light sensor may be attached to a moving component and is exposed when the piece is moved.

The moving component 100 can be implanted in the board (book or puzzle) or secured by a fastener such as a rivet on top of the board that would allow the action piece to rotate. As can be appreciated by those skilled the art and in various aspects, the moving component 100 can be a piece of paperboard or other material that can be slid between layers of the book or puzzle or rotated through a pivotal connection, or lifted off as in puzzle configuration.

Submitted herewith are several images of non-limiting examples of moving action pieces (components) 100 that can be slid or rotated to alter the illustration and expose a sensor 102.

For example and as shown in FIGS. 1A and 1B, the moving component 100 is sandwiched between a top illustrative layer 106 and a bottom base layer 108. In this non-limiting example example, the moving component 100 include a finger tab which is part of and extends from the illustrative portion (e.g., squirrel image). A user could then use the finger tab and slide the moving component 100 laterally, causing the illustrative portion to move (hiding the squirrel behind the bush) and expose the sensor 102 (e.g., light sensor, etc.) embedded in the bottom base layer 108. Once the sensor 102 is exposed, the attached circuitry and/or speaker 104 emit the pre-programmed sound (e.g., such as a squirrel chirping, etc.).

Figure 2B:
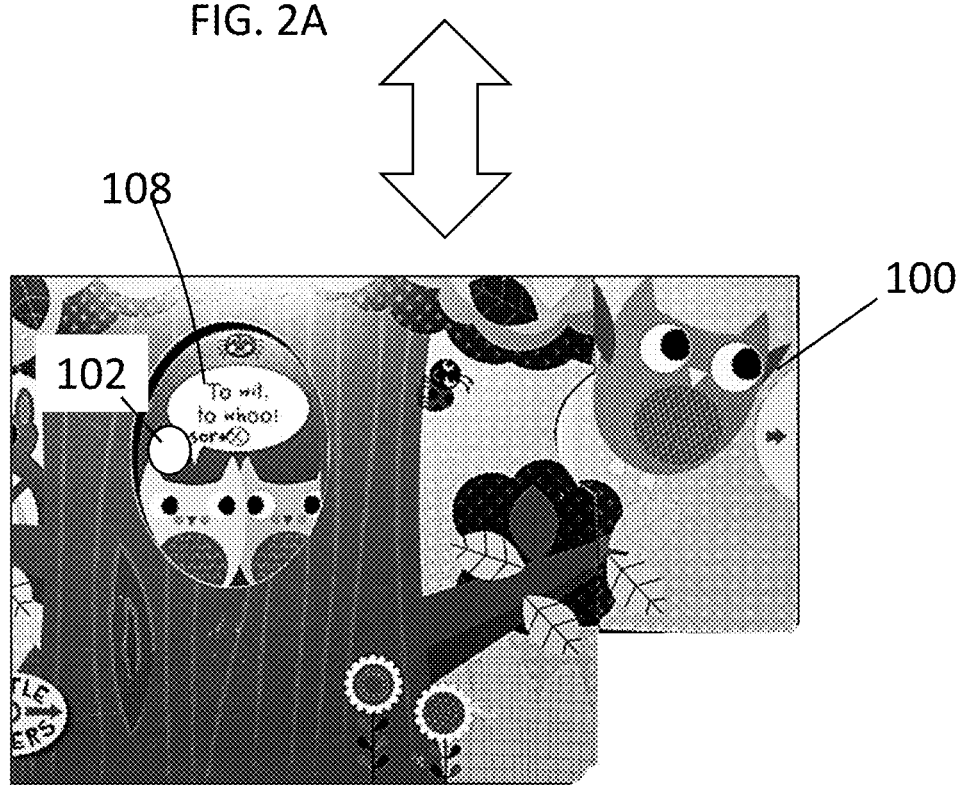
FIG. 2B is an illustration of the page or puzzle piece as shown in FIG. 2A, depicting the moving component in the second position to expose a sensor.

Yet another non-limiting example is depicted in FIGS. 2A and 2B. In this example, pulling the moving component 100 (e.g., pull tab) causes the attached illustrative portion to pull the sitting owl 200 to be concealed by sliding under the top illustrative layer 106, while revealing the baby owls and a flying away owl printed on the bottom base layer 108 and also exposing the sensor 102 to cause the corresponding sound to be emitted. In this example, as the moving component 100 is slid out from behind the illustrative layer, the newly revealed moving component 100 actually expands the overall illustrative area as shown.

Figure 3A:
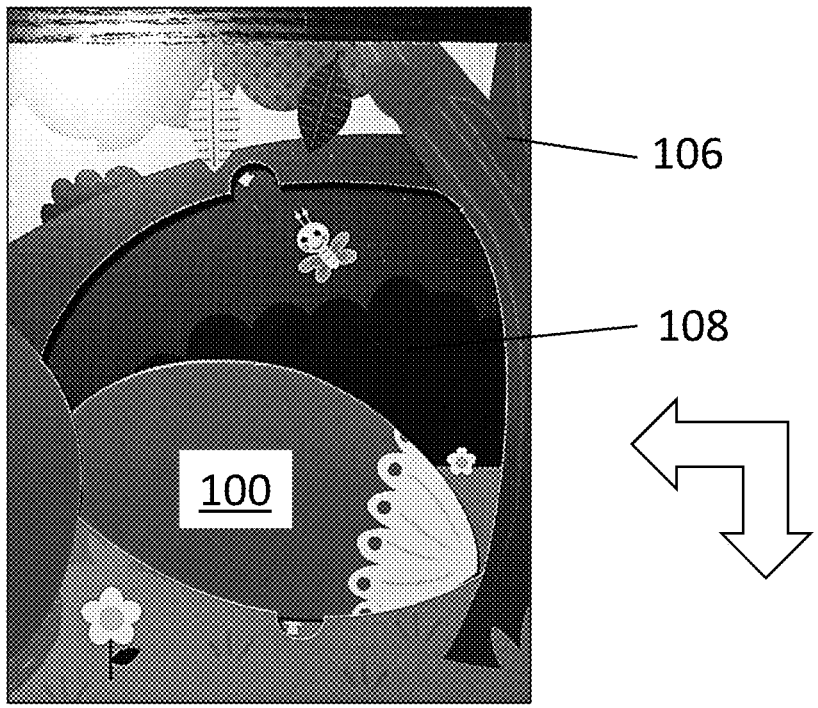
FIG. 3A is an illustration of a page or puzzle piece with a moving component in a first position.
Figure 3B:
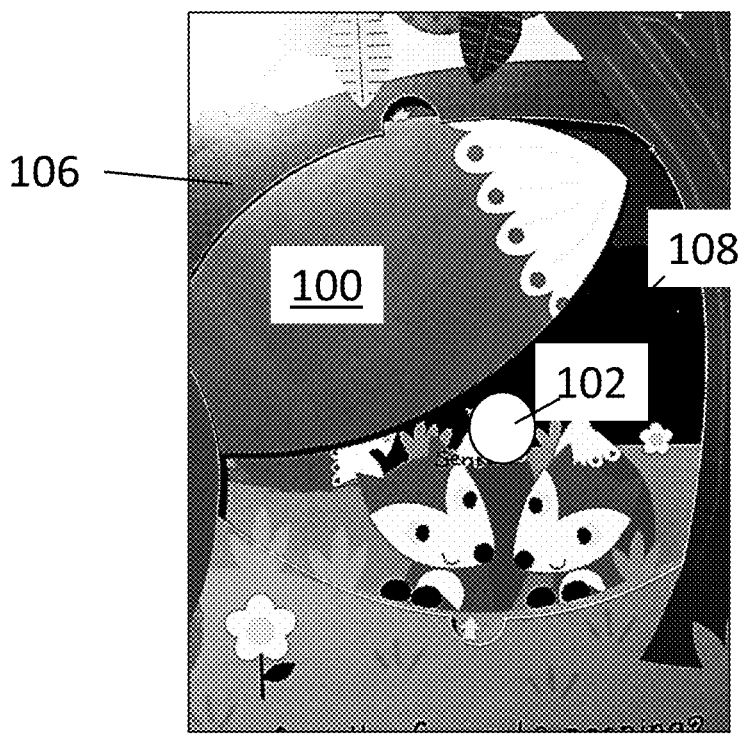
FIG. 3B is an illustration of the page or puzzle piece as shown in FIG. 3A, depicting the moving component in the second position to expose a sensor.

In yet another example and as shown in FIGS. 3A and 3B, the moving component 100 can be rotatably connected between the top illustrative layer 106 and the bottom base layer 108. In this aspect, rotating the moving component 100 (e.g., fox's tail) exposes the illustration printed upon the base layer (e.g., baby foxes) and the sensor 102 to cause the corresponding sound to be emitted. For example, if the sensor 102 is a light sensor, it is then activated by exposure to light. Alternatively and as another example, if the sensor 102 is a touch sensor, it can then be exposed to touch by the reader which causes the sound to be emitted.

Yet another example is depicted in FIGS. 4A and 4B. In this example, the moving component 100 is a rotatable wheel with a window 400 formed therethrough. The moving component 100 is rotatably fixed between the top illustrative layer 106 and bottom base layer 108 such that it can rotate therebetween. Further, the moving component can be formed to include illustrations thereon such that rotating the moving component 100 moves various illustrations into view based on the cut-out form of the top illustrative layer 106. Additionally, rotating the moving component 100 causes the window 400 to rotate around such that at some point, the sensor 102 is exposed through the window 400 to cause the corresponding sound to be emitted. For example and with respect to this particular illustration, rotating the moving component 100 (e.g., background wheel) causes a first rabbit to rotate behind a foreground bush (formed on the top illustrative layer 106) and a second rabbit to appear and become exposed.

Figure 5A:
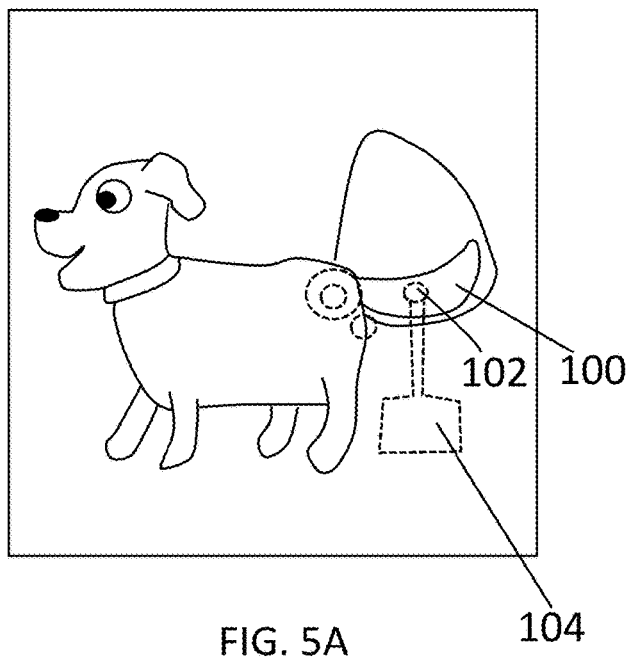
FIG. 5A is an illustration of a page or puzzle piece with a moving component in a first position.
Figure 5B:
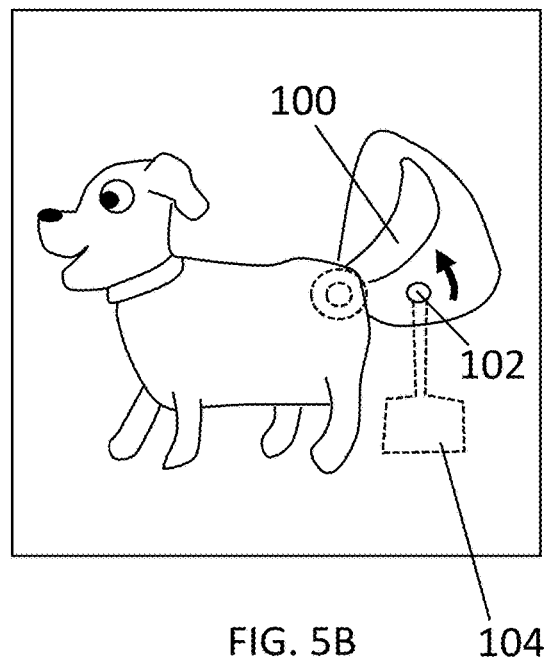
FIG. 5B is an illustration of the page or puzzle piece as shown in FIG. 5A, depicting the moving component in the second position to expose a sensor.

The concept of the moving component 100 is further illustrated in FIGS. 5A and 5B, which depict an example in which the moving component 100 is a dog's tail. Rotating the moving component 100 in this example from a first position to a second position exposes the sensor 102 to cause the corresponding sound to be emitted by the circuitry and/or speaker 104 when the sensor 102 is exposed to, for example, light or touch (if a touch sensor).

Figure 6A:
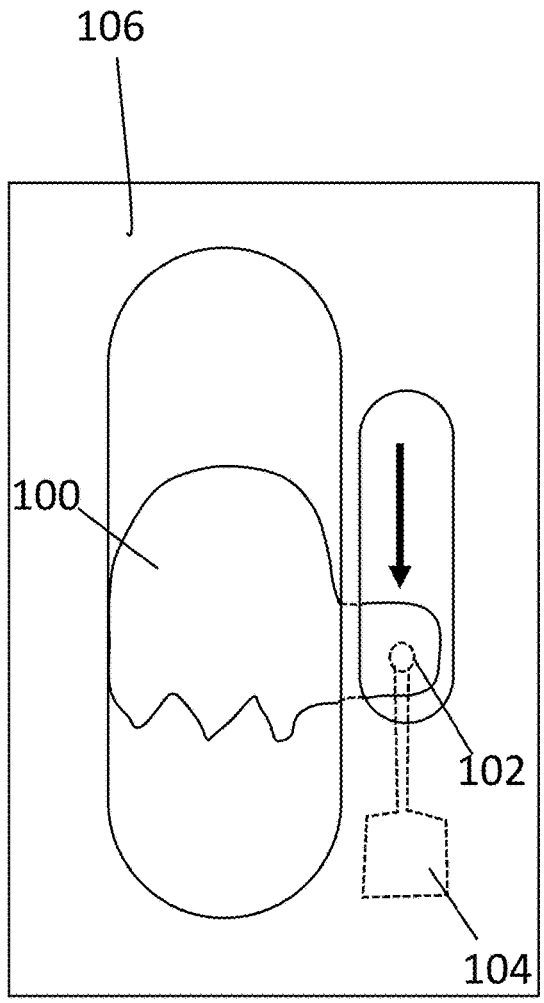
FIG. 6A is an illustration of a page or puzzle piece with a moving component in a first position.
Figure 6B:
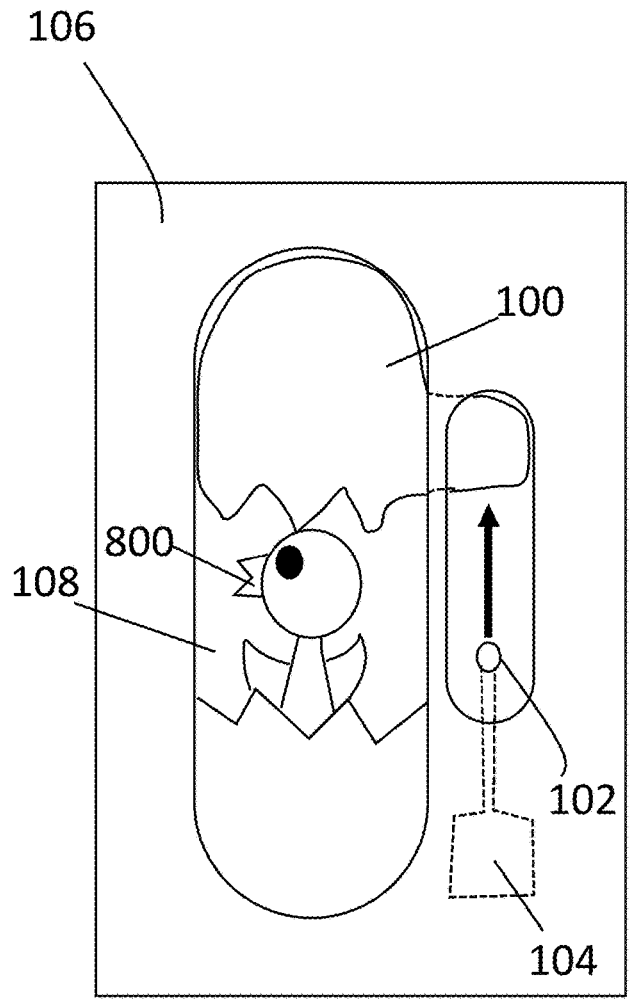
FIG. 6B is an illustration of the page or puzzle piece as shown in FIG. 6A, depicting the moving component in the second position to expose a sensor.

As noted above, the moving component 100 can also be slid between the various slayers of the board. As shown in FIGS. 6A and 6B, the moving component 100 can be slideably positioned between the top illustrative layer 106 and bottom base layer 108. Upon sliding the moving component 100 (for example, using a tab portion), the sensor 102 is exposed as well as additional illustrative content printed, painted, adhered, or otherwise formed on the bottom base layer 108.

Figure 7A:
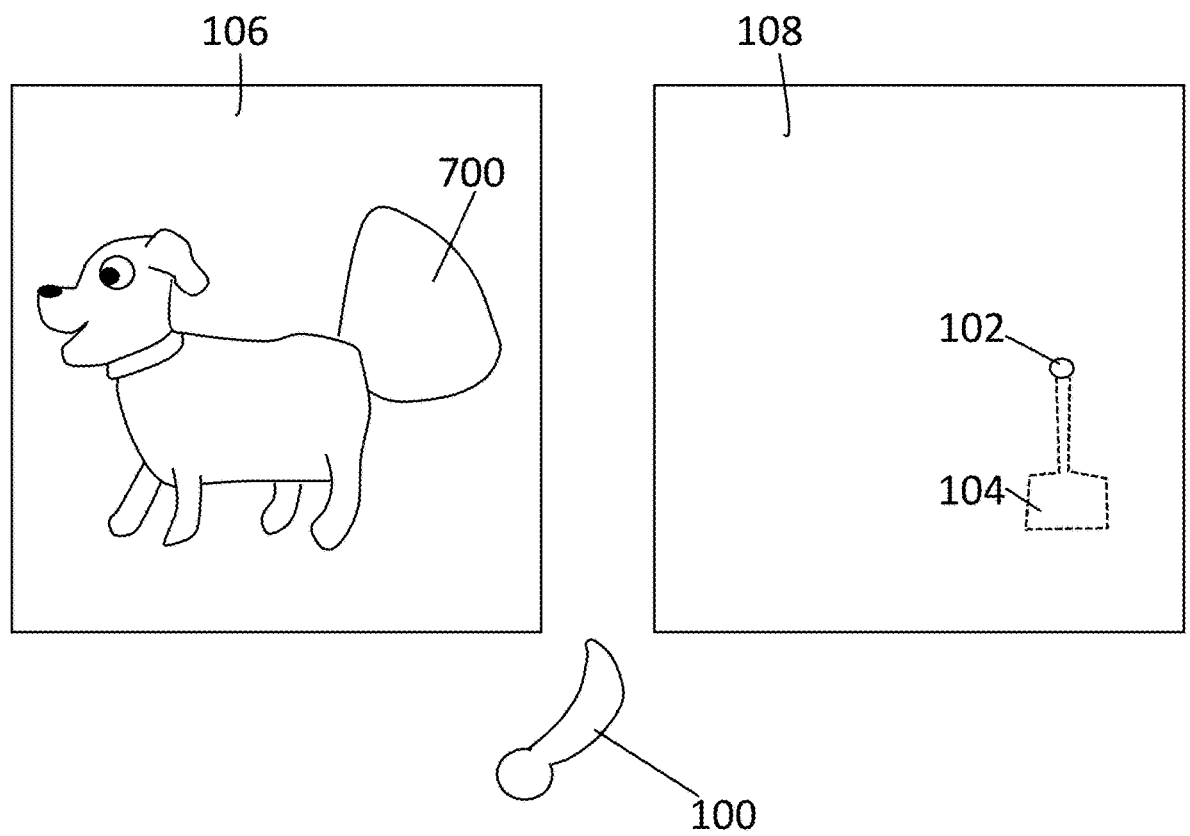
FIG. 7A is an illustration of a top illustrative layer, a moving component, and a bottom base layer according to various embodiments of the present invention.
Figure 7B:
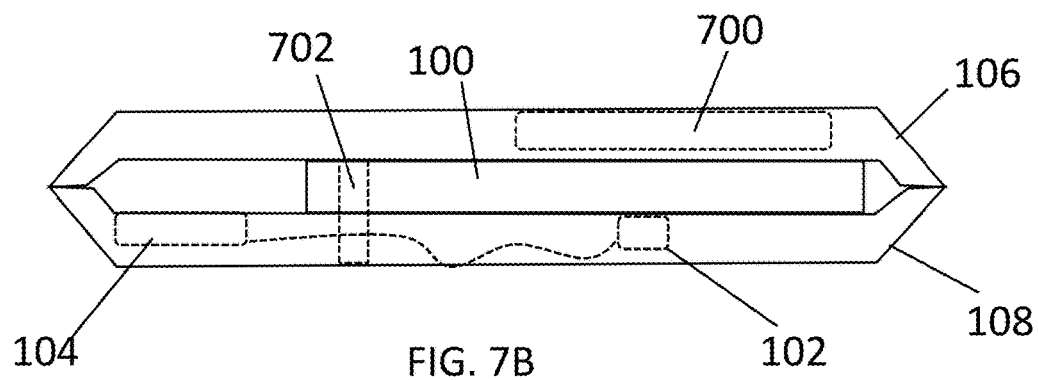
FIG. 7B is a cross-sectional, side-view illustration of the top illustrative layer, moving component, and bottom base layer according to various embodiments of the present invention.

For further understanding, FIG. 7A provides an illustration of an example of a top illustrative layer 106, the moving component 100, and a bottom base layer 108 (with sensor 102 and circuit and/or speaker 104 embedded therein (or otherwise affixed with the board)). In this example, the top illustrative layer 106 includes a window 700 cut therefrom. As shown in FIG. 7B, the moving component 100 can be rotatably connected 702 between the top illustrative layer 106 and bottom base layer 108 such that the moving component 100 is visible through the window 700. Further, if the moving component 100 is rotated (as shown in FIG. 5B), the sensor 102 is exposed through the window 700 to expose the sensor 102 to light (if a light sensor) or to touch (if a touch sensor) to actuate the circuit and/or speaker 104.

In some aspect, the top illustrative layer 106 is connected with the bottom base layer 108 using any suitable technique as understood by those skilled in the art. For example, the top illustrative layer 106 can be integrally formed with the bottom base layer 108, such as a cardboard sheet that is folded in half to form two layers. As another non-limiting example, the two layers 106 and 108 can be glued to one another. Thus, any suitable technique can be employed to form a board that includes a moving component 100 movably connected with respect to the top illustrative layer 106 and a bottom base layer 108.

In another aspect, the moving component 100 can be removably attached with the bottom base layer 108. For example, the bottom base layer 108 can serve as a puzzle base with the top illustrative layer 106 having one or more cut-out shapes (such as the windows previously described) that are formed to accommodate and match with a moving component 100. In this example, the moving component 100 can be a puzzle piece that fits within the cut-out shapes (in a first position) in the top illustrative layer 106 and that can be lifted from the board (in a second position) to expose a sensor 102 attached with the bottom base layer 108. Additionally and in various aspect, the layers 106, 108, and 100 can be formed of any suitable material to collectively form the board, non-limiting examples of which include paperboard, plastic, and wood.

In the sliding aspect and as understood by those skilled in the art, the moving component is sandwiched between the top illustrative layer 106 and bottom base layer 108 such that the moving component 100 can be optionally slid between a first and second position to cover or expose the sensor 102. It should also be understood that the invention described herein includes all of the necessary components as may be needed to impart the functionality and invention as described to provide actions and sounds in a new, intuitive way that engages the child's visual and auditory senses.

It should be noted that although the sensor 102 described above may be referred to as a light sensor, the invention is not intended to be limited thereto as any suitable sensor or actuatable mechanism or device can be substituted for the light sensor. As a non-limiting example, the sensor 102 can be a touch sensor instead of a light sensor. A non-limiting example of such a touch sensor is a capacitive touch switch, or any other suitable sensor or switch that can be activated by touch. The touch switch is desirably largely planar or flat such that it can be easily incorporated into the pages of the book an allow for the moving component 100 to easily slide over or rotate by, etc., the touch switch. Thus, in this aspect, the book and moving components 100 are formed such that movement of the moving component 100 will expose a touch sensitive switch (i.e., the touch sensor) that will be activated by finger touch (e.g., the reader's finger will slide on to the touch sensitive switch as the moving component 100 is moved). For example, the tab that is used to slide or otherwise move the moving component 100 is framed to align with and expose the touch sensor 102 when moved, thereby causing the reader's finger to engage with or otherwise touch the touch sensor.

For further understanding, FIGS. 8A and 8B provide illustrations depicting an aspect where the sensor 102 is a touch sensor. Further, the figures depict the moving component 100 as a slider that is sandwiched between layers in a space 800 reserved to accommodate and allow the moving component 100 to selectively be slid. The moving component 100 as shown in FIG. 8A is in the concealed position to conceal the touch sensor 102. While the location of the touch sensor 102 is depicted, the sensor itself is concealed as positioned beneath the moving component 100. The moving component 100 is accessible via a window 802 in the top layer of the page. A finger tab 804 or other cutout or shape may be formed through the moving component 100 to allow the reader or user to easily slide or otherwise move the moving component 100.

For example, FIG. 8B depicts the moving component 100 as being slid up in the space 800 to lift the face of the pig 806 (or other illustration) into the viewing window 700 that is cut through the top illustrative layer of the page. Notably, the finger tab 804 or cutout is formed such that when the moving component 100 is moved into the exposed configuration, the touch sensor 102 is aligned with the finger tab 804. Thus, in moving the moving component 100, the user's fingers will inevitably contact the touch sensor 102 to activate the sound generation components and cause the programmed sound to be emitted.

Although FIGS. 8A and 8B are described with respect to a touch sensor, it should be understood that the aspect as depicted and described herein could be used with either a finger touch sensor or a light sensor (or any other suitable sensor or switch). For the finger touch sensor, the Pig slider (i.e., moving component) has a finger tab 804 in it that falls over the touch sensor 102 when the slider is pushed up. Alternatively, if a light sensor were used, it would be positioned as depicted in FIG. 8B such that it would be exposed when the moving component 100 was moved. Thus, the various sensors are alternative sound producing activation methods.

Figure 9A:
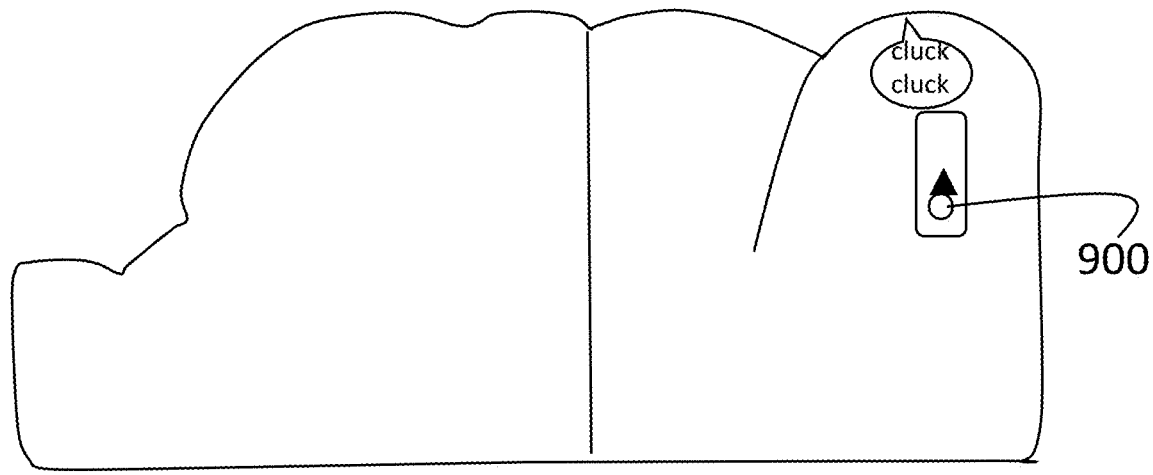
FIG. 9A is an illustration depicting an aspect where the sensor is a touch sensor according to various embodiments of the present invention, depicting the moving component in a concealed position to conceal the touch sensor.
Figure 9B:
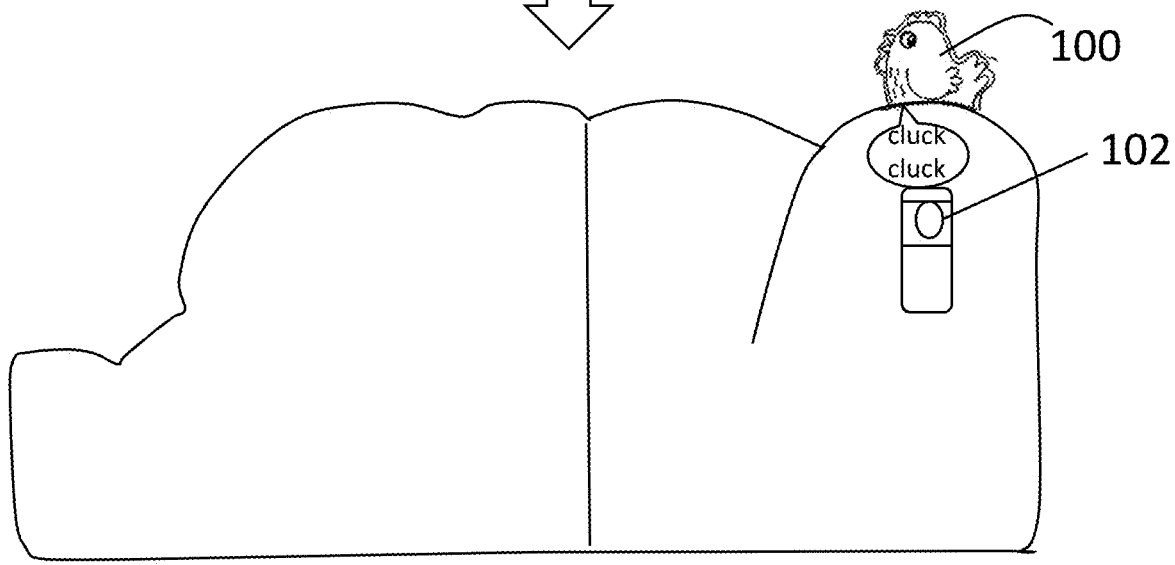
FIG. 9B is an illustration of the page or puzzle as shown in FIG. 9A, depicting the moving component and its finger tab as sliding up to an exposed position to expose the touch sensor.

For further understanding, another non-limiting example is depicted in FIGS. 9A and 9B. FIGS. 9A and 9B show an example operation of a touch sensor 102 for sliding sounds. In this example, a finger hole is formed as a movable finger tab 900 (presented by a circle) which allows for movement of the moving component. When the tab 900 is pushed up using the hole, the hole lays over the touch sensor 102, represented by a black dot with stroke marks surrounding it. When the user's finger touches the sensor 102 it activates a sound. At the same time, moving the tab 900 causes a change in the illustration by virtue of sliding the moving component 100. In this non-limiting example, the movement component 100 includes a hen illustration which cause a hen to appear at the top of the page, being part of the moving tab 900 (and moving component 100). For example, the moving component 900 is a single sheet or board that has the finger tab 900 as an extension on one end and the hen on the other. Note, in another aspect, the hen or other desired illustration could also appear in a hole in the page.

Further, it should be understood that the use of the touch sensor can be used in any of the aspects as described and illustrated, with the placement of the touch sensor being strategically positioned such that motion of the moving component 100 (sliding, rotating, etc.) by the user would cause the user to expose touch sensor.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A board for use as a book page or puzzle with a moving action piece, comprising:
a generally planar top illustrative layer;
a bottom base layer attached with the top illustrative layer, the bottom base layer having a sensor and sound generation components for generating a sound based upon actuation of the sensor;
a moving component movably connected with the bottom base layer;
wherein the sensor is connected with the bottom base layer and positioned such that moving the moving component from a first position to a second position exposes the sensor to allow for activation of the sound generation components; and
wherein the moving component includes a finger tab formed such that when the moving component moves from the first position to the second position, the finger tab is aligned with the sensor to expose the sensor to a user's touch to allow for activation of the sound generation components.

* * * * *